United States Patent
Kiely

(10) Patent No.: US 7,494,157 B1
(45) Date of Patent: Feb. 24, 2009

(54) ELECTRICAL CONNECTOR WITH SNAP FIT RETAINING RING WITH IMPROVED HOLDING AND GROUNDING TANGS

(75) Inventor: Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 188 days.

(21) Appl. No.: 11/091,095

(22) Filed: Mar. 28, 2005

Related U.S. Application Data

(60) Provisional application No. 60/566,220, filed on Apr. 28, 2004.

(51) Int. Cl.
*F16L 27/00* (2006.01)

(52) U.S. Cl. ............. 285/139.1; 285/154.1; 285/149.1; 439/142

(58) Field of Classification Search ... 285/154.1–154.4, 285/149.1, 139.1; 174/669, 668, 64; 439/557, 439/142
See application file for complete search history.

(56) References Cited

U.S. PATENT DOCUMENTS

| | | | |
|---|---|---|---|
| 1,483,218 A | | 2/1924 | Fahnestock |
| 2,160,353 A | | 5/1939 | Conners |
| 2,744,769 A | | 5/1956 | Roeder et al. |
| 4,032,178 A | | 6/1977 | Neuroth |
| 4,621,166 A | | 11/1986 | Neuroth |
| 4,773,280 A | * | 9/1988 | Baumgarten ............... 403/197 |
| 4,880,387 A | | 11/1989 | Stikeleather et al. |
| 5,171,164 A | | 12/1992 | O'Neil et al. |
| 5,189,258 A | | 2/1993 | Pratesi |
| 5,266,050 A | | 11/1993 | O'Neil et al. |
| 5,342,994 A | * | 8/1994 | Pratesi ...................... 174/669 |
| 5,373,106 A | | 12/1994 | O'Neil |
| 6,043,432 A | | 3/2000 | Gretz |
| 6,080,933 A | | 6/2000 | Gretz |
| 6,114,630 A | | 9/2000 | Gretz |
| 6,133,529 A | | 10/2000 | Gretz |
| 6,335,488 B1 | | 1/2002 | Gretz |
| 6,352,439 B1 | | 3/2002 | Stark et al. |
| 6,355,884 B1 | | 3/2002 | Gretz |
| 6,444,907 B1 | | 9/2002 | Kiely |
| 6,555,203 B1 | | 4/2003 | Karlsson |
| 6,596,939 B1 | * | 7/2003 | Gretz ........................ 174/359 |
| 6,604,400 B1 | | 8/2003 | Gretz |

(Continued)

*Primary Examiner*—Aaron M Dunwoody
(74) *Attorney, Agent, or Firm*—Fattibene and Fattibene; Paul A. Fattibene; Arthur T. Fattibene

(57) ABSTRACT

A snap fit electrical connector assembly and a snap fit retainer ring circumscribing the smooth outlet end portion of a connector body wherein the retainer ring is formed from an elongated blank of spring steel material having a leading edge and a trailing edge wherein a holding tab is formed out of the plane of the blank and is cantileverly bent inwardly when formed into a ring. The holding tab is providing with an inwardly bent lip at the free end thereof arranged to be snap fitted in a corresponding slot formed in the outlet end portion of the connector body for securing the retainer ring and the outlet portion of a connector body. The retainer ring is also formed with a series of longitudinally combined locking and grounding tangs which are cantileverly bent radially outwardly of the ring for securing and electrically grounding the connector assembly to an electrical box.

5 Claims, 2 Drawing Sheets

U.S. PATENT DOCUMENTS

| | | |
|---|---|---|
| 6,670,553 B1 | 12/2003 | Gretz |
| 6,682,355 B1 | 1/2004 | Gretz |
| 6,780,029 B1 | 8/2004 | Gretz |
| 6,849,803 B1 | 2/2005 | Gretz |
| 6,860,758 B1 | 3/2005 | Kiely |

* cited by examiner

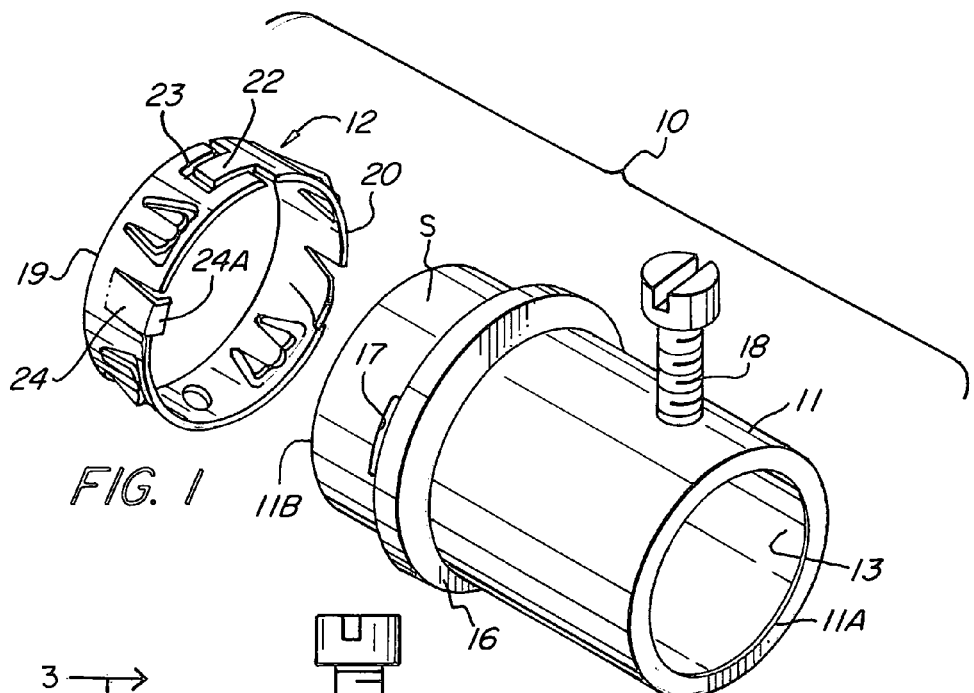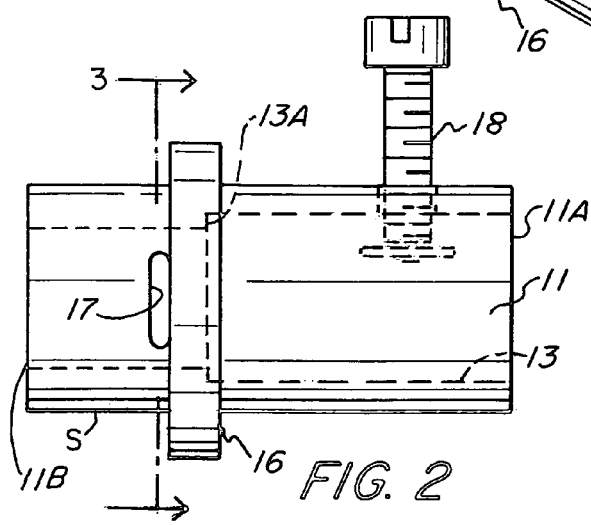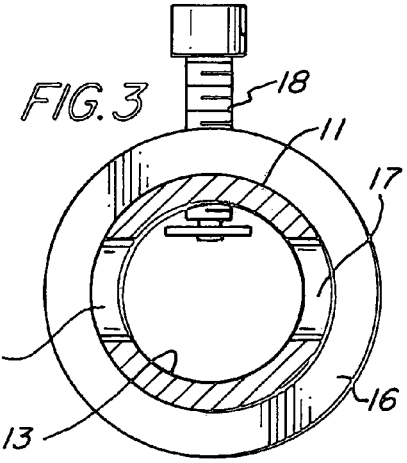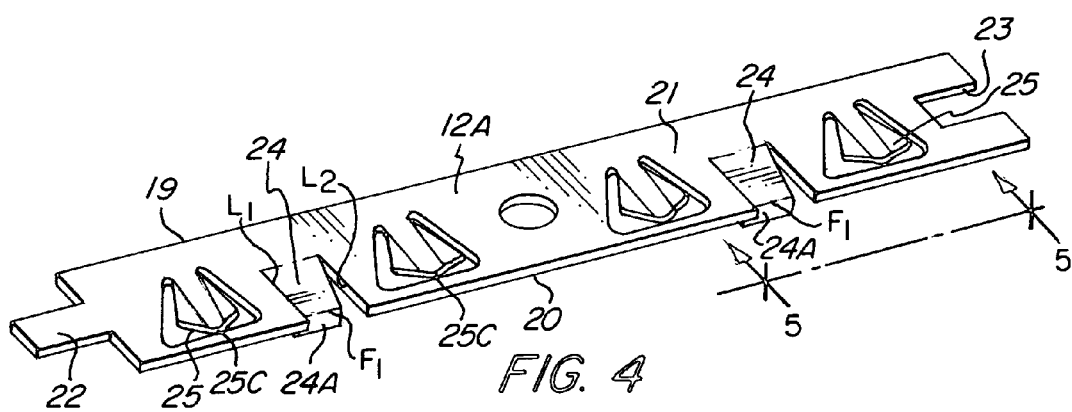

ELECTRICAL CONNECTOR WITH SNAP FIT RETAINING RING WITH IMPROVED HOLDING AND GROUNDING TANGS

RELATED APPLICATION

This application claims the benefit of U.S. Provisional Application No. 60/566,220 filed Apr. 28, 2004.

FIELD OF THE INVENTION

This invention is directed to an electrical connector, and more specifically to an electrical connector having a snap fit retainer ring formed with improved holding and electrical grounding tangs.

BACKGROUND OF THE INVENTION

Electric connectors are commonly used for attaching electrical conductors, cables, wires, electrical metal tubing (EMT) and/or the like to an electrical box, e.g. an outlet box, junction box, fuse box and/or such other type electrical boxes. Such known electrical connectors are either of the type that are threadedly attached to an electrical box by a threaded lock nut or by means of a snap fit retaining ring of the type disclosed in U.S. Pat. Nos. 1,483,218; 2,160,353; 2,744,769; 4,032,178; 4,621,166; 4,880,387; 5,171,164; 5,189,258; 5,266,050; 5,373,106; 6,043,432; 6,080,933; 6,114,630; 6,133,529; 6,335,488; 6,352,439; 6,355,884; 6,444,907; 6,555,203; 6,596,939; 6,604,400; 6,670,553; 6,682,355; 6,780,029; 6,849,803 and 6,860,758.

This invention is directed to snap fit retainer connectors of the type disclosed in the above noted patents in an effort to obviate some of the noted disadvantages generally experienced with the known connectors utilizing a snap fit retainer ring and to simplify the structure and/or assembly of such snap fit electrical connectors.

SUMMARY OF THE INVENTION

An object of this invention is to provide an electrical connector assembly having a snap fit retainer ring circumscribing a smooth outlet end of a connector body.

Another object is to provide an electrical connector assembly having a snap fit retainer ring secured to a connector body such that relative rotation between the retainer ring and connector body is prohibited.

Another object of this invention is to provide an improved snap fit retainer ring having holding tangs positively retaining the retainer ring about the outlet end of an electrical connector body and combined locking and grounding tangs circumferentially spaced about the retainer ring.

The foregoing objects and other features and advantages are attained by an electrical connector that includes a connector body having a conductor inlet end portion and a conductor outlet end portion formed with a radially outwardly extending stop flange circumscribing the connector body between the inlet opening and outlet opening. A snap fit retainer circumscribes the outlet end portion of the connector body. The spring steel retainer ring is formed from a blank of spring steel material which can be readily rolled to form the retainer ring.

In accordance with this invention, the spring steel blank is provided with a longitudinal leading end and a longitudinal trailing end, having one or more holding tabs blanked, die cut, lanced or otherwise formed out of the plane of the blank. The respective holding tabs are bent inwardly of retainer ring, when the blank is rolled to define the retainer ring. The free end of the respective holding tabs includes a segmented portion of the trailing edge which is inwardly bent to engage a complementary slot formed on the outlet portion of the connector body when the retainer ring is positioned on the outlet end of the connector body.

Also formed out of the spring steel blank are a series of combined grounding and locking tangs that are blanked out of the intermediate portion of the blank and cantileverly bent radially outwardly of the blank when formed into a retainer ring. The arrangement is such that when the connector body and associated retainer ring is inserted through a knock out hole of an electric box, the locking and grounding tangs function to securely lock the connector body to the electric box and effecting a positive electric ground, while at the same time the tolerance of the knock out hole entraps the holding tab within its complementary slot so as to prohibit any unlatching of the holding tab from its complementary slot.

IN THE DRAWINGS

FIG. 1 is an exploded perspective view of an electrical connector assembly embodying the invention.

FIG. 2 is a side view of a connector body of the electrical connector assembly embodying the invention.

FIG. 3 is a sectional view taken along line 3-3 on FIG. 2.

FIG. 4 is a perspective plan view of the blank from which the retainer ring is formed.

DETAILED DESCRIPTION

Figure 5:
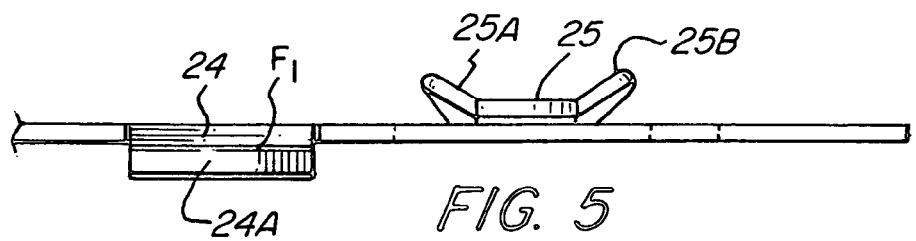
FIG. 5 is a fragmentary side view of the blank taken along line 5-5 on FIG. 4.

FIGS. 1 to 7 illustrate one embodiment of the invention. As shown, the electrical connector assembly 10 includes a connector body 11 and an associated improved snap fit retainer ring 12. The connector body or bushing 11 may be comprised generally of a metal casting, e.g. zinc or other suitable metallic material. The connector body 11 may also be formed from sheet metal as distinguished from a cast metal body. The connector body has a bore 13 extending therethrough adapted to define a passageway for receiving an electrical conductor, wire, cable or the like which is to be connected within an electric box such as an outlet box, fuse box, junction box or the like. The bore 13 is formed with an internal shoulder 13A intermediate the ends thereof, which functions as a cable stop to limit the distance a cable or conductor shield may be inserted into the connector body 11. The connector body 11, for purposes of description, includes an inlet end 11A for receiving an electrical conductor (not shown) and an outlet end 11B which is adapted to extend through a knockout hole 14 of an electric box 15. Circumscribing the connector body 11 between the inlet end 11A and outlet end 11B is a radially outwardly extending flange 16. The flange 16 functions as a stop to limit the distance the outlet end 11B may extend through the knockout hole 14 as noted in FIG. 6.

As best seen in FIG. 2, the outlet end 11B of the connector body 11 adjacent the flange 16 is provided with at least one or more circumferentially spaced slots or holes 17. In the illustrated embodiment, at least two such slots or holes 17 are circumferentially spaced approximately 180° apart. While only two such slots or holes 17 are illustrated, it will be understood that more than two such slots or holes 17 may be circumferentially spaced about the outlet end 11B. As shown in FIG. 2, the outer circumscribing surface "S" of the outlet end 11B is generally smooth. It will be understood that the inlet end 11A may be provided with a suitable means for securing an electrical conductor to the inlet end 11B to prohibit any unintentional separation of the electrical conductor from the connector body 11. In the illustrated embodiment, the securing means may take the form of a threaded set screw 18 which can be threaded inwardly to secure the electrical conductor or wire passing through the conductor body. It will be understood that other conventional and well known securing means may be used in lieu of the screw fastener means 18 described.

Supported on the outlet end 11B and circumscribing the outlet end 11B is a snap fit retainer ring 12. The retainer ring 12 is formed of any suitable spring steel or other suitable metallic material having the desired resistency capable of resiliently embracing the outlet end 11B of the connector body 11. Preferably, the ring 12 is formed from an elongated blank 12A of spring steel or the like, as best shown in FIG. 4. The blank 12A includes a leading longitudinal edge 19, a trailing longitudinal edge 20 and an intermediate portion 21 disposed between the leading and trailing edges 19 and 20. The opposed ends of the blank 12A preferably terminate in a projecting tongue 22 at one end and a complementary slot or notch 23 at the other end, wherein the tongue 22 is adapted to be received within the slot or notch 23 when the blank 12A is formed to define the circular or annular retainer ring 12, as shown in FIG. 1.

In accordance with this invention, one or more holding tab or lip 24 are formed, lanced, cut or blanked out of the blank 12A. As shown in FIG. 4, the blank 12A is provided with two such holding tabs 24 or lips, longitudinally spaced along the trailing edge 20. In the illustrated embodiment, the holding tabs 24 are spaced along the blank 12A so that when formed into a ring 12, the holding tabs 24 are disposed approximately 180° apart. However, it will be understood that the blank 12A may be formed with one or more holding tabs 24 without departing from the spirit or scope of the invention.

As shown, the holding tabs 24 are blanked, formed or lanced out of the blank 12A along the trailing edge 20 of the blank 12A. The holding tabs 24 are severed or cut along a pair of cut lines $L_1$, $L_2$ perpendicular to the trailing edge 20 of blank 12A, whereby the holding tab 24 so formed may be bent inwardly of the formed ring 12. The tip edge 24A of tabs 24, in turn, is bent about a transverse foldline $F_1$ to an approximately 90° angle relative to the main portion of the holding tab 24.

Longitudinally spaced along the blank 12A and between the leading and trailing edges 19 and 20 respectively are a series of locking and grounding tangs 25. In the illustrated embodiment, four such locking and grounding tangs 25 are formed. However, a ring embodying this invention may be provided with more or less number of locking and grounding tangs 25.

Figure 6:
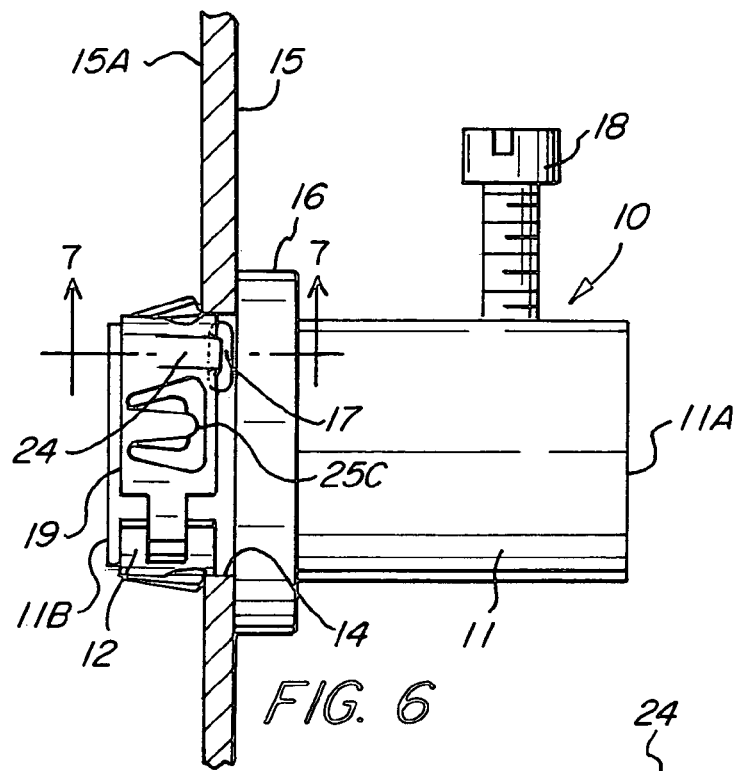
FIG. 6 is a side view of the electrical connector assembly attached to an electrical box.

Tangs 25 are blank, die cut, lanced, or formed out of the plane of the blank 12 between the opposed longitudinal leading and trailing edges 19 and 20. The free end of the respective tangs 25 are slightly spaced inwardly of the trailing edge 20. As noted, the tangs 25 are bent radially outwardly of the plane or surface of the blank 12A as shown in FIGS. 4 and 6, or in a direction opposite to that of the holding tabs 24.

Tangs 25 are formed with opposed outwardly bent wing portions 25A, 25B which are arranged to be cammed inwardly as the connector assembly 10 is inserted through a knockout hole 14 of an electric box 15. The respective tangs 25 are also provided with a projecting center tit or projection 25C. As best seen in FIG. 6, the free ends of the wing portions 25A, 25B of tangs 25 engage the inner surface 15A of the electric box while the projection or tit 25C engages the periphery of the knockout hole 14 to insure a positive electric grounding between the connector assembly 10 and the electric box 15, when in the fully inserted position as best shown in FIG. 6.

Figure 7:
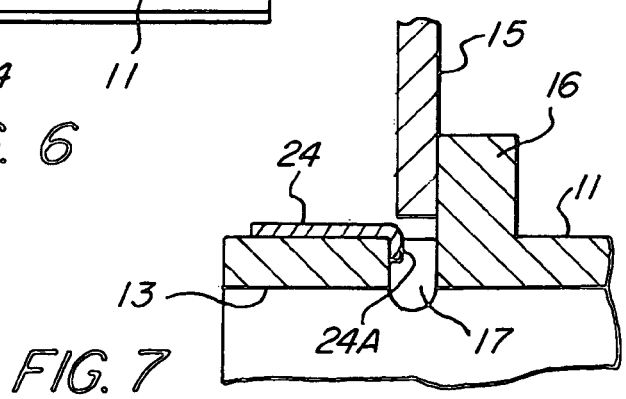
FIG. 7 is an enlarged sectional view detail taken along line 7-7 on FIG. 6.

To form the retainer ring 12, the blank 21, as herein described, is rolled or formed into a ring as shown in FIG. 1. The ring 12 so formed is slipped or placed onto the outlet end 11B of the connector body 11 so that the lip 24A of the holding tabs 24 are disposed in alignment with the slots 17 on the outlet end 11A located immediately adjacent the flange 16, whereby the resilient nature of the holding tabs 24 causes the tip 24A to be seated in its complementary or corresponding slot 17. It is to be noted that when the connector assembly 10 is fully inserted in the knockout hole, the tolerances are such that the periphery of the hole 14 prohibits the holding tabs 24 from becoming free of the slots 17 to insure a positive holding engagement of the retainer ring 12 onto the outlet end 11B of the connector body 11. Thus, the engagement of the tip 24A within its corresponding slot 17 positively secures the retainer ring 12 onto the outlet end 11B when the connector assembly is fully inserted through the knockout hole, as best seen in FIG. 7.

From the foregoing description, it will also be apparent that the retainer ring 12, when fitted onto the outlet end 11B of the connector body 11, is prohibited from being rotated about the periphery of the outlet end 11B by the tips 24A of the holding tabs being received in slots 17.

While the present invention has been described with respect to the illustrated embodiment, it will be understood that various modifications may be made without departing from the spirit or scope of the invention.

What is claimed is:

1. An electric connector assembly comprising:

an electric box having a support wall with a hole extending through the thickness of said support wall, a connector body having an inlet end for receiving an electrical conductor, an outlet end adapted to be inserted through said hole and a radially outwardly extending flange between said inlet end and said outlet end, said flange forming a stop to limit the distance said outlet end may extend through said hole of said support wall, a slot formed in said outlet end adjacent to said flange, said slot extending into said hole when said outlet end is fully inserted through said hole, and a retainer ring surrounding said outlet end, said retainer ring having a leading edge, a trailing edge, and an intermediate portion therebetween, a holding tab blanked out of said intermediate portion of said ring, said holding tab including a segment of said trailing edge forming a free end of said holding tab, said free end being angularly and inwardly bent relative to said intermediate portion of said ring so as to be received in said slot within said hole for securing said ring onto said outlet end, and a combined locking and grounding tang blanked out of said intermediate portion between said leading edge and said trailing edge said retainer ring, said combined locking and grounding tang being outwardly bent relative to said intermediate portion and angularly inclined in the direction of said training edge of said ring, and said locking and grounding tang includes opposed longitudinally outwardly bent wing portions and a projecting tit therebetween whereby said tit engages a periphery of said hole of said wall to effect an electric ground therewith when said connector body is inserted through said hole, and said wings securing said connector body to said support wall.

2. An electrical connector assembly as defined in claim 1 wherein:
said outlet end includes a smooth outer surface.

3. An electrical connector assembly as defined in claim 1 wherein:
said inlet end of said connector body includes a means for securing an electric conductor within said inlet end.

4. An electrical connector assembly as defined in claim 3 wherein said last mentioned means includes a set screw.

5. An electrical connector assembly comprising:
an electric box having a hole therein,
a connector body having an inlet end for receiving an electrical conductor, an outlet end adapted to be inserted through said hole of said electric box,
a radially outwardly, extending flange disposed between said inlet end and outlet end,
said outlet end having an outer, smooth, circumscribing surface,
a slot formed on said outlet end adjacent said flange, said slot being located within said hole when said outlet end of said connector body is fully inserted through said hole,
a spring steel retainer ring circumscribing said outlet end,
said retainer ring including a leading circumscribing edge, a trailing circumscribing edge, and an intermediate portion therebetween,
a holding tab blanked out of the plane of said retainer ring, said holding tab defined by a pair of spaced apart cut lines extending normal to said trailing circumscribing edge,
said holding tab including a segment of said trailing circumscribing edge,
said segment forming a free end of said holding tab said free end of said holding tab being angularly bent inwardly relative to said intermediate portion of said ring, whereby said free end is adapted to be received within said slot within said hole,
and a plurality of combined locking and grounding tangs blanked out of said intermediate portion of said retainer ring and circumferentially spaced about said ring,
each of said locking and grounding tangs being cantileverly bent outwardly of said intermediate portion of said ring whereby the free ends of said locking and grounding tangs are spaced inwardly of said trailing circumscribing edge,
and each of said locking and grounding tangs include projecting tit adapted to engage said hole, and said locking and grounding tangs having opposed longitudinal edges forming outwardly bent wings, whereby the free edges of said wings are arranged to engage the inner surface of said electrical box to lock said connector body to said electrical box, and
means for securing an electrical conductor extending through said connector body to said inlet end.

\* \* \* \* \*